United States Patent [19]

Yoshimura et al.

[11] Patent Number: 5,369,065
[45] Date of Patent: Nov. 29, 1994

[54] SILICON NITRIDE SINTERED BODY AND PROCESS FOR PRODUCING THE SAME

[75] Inventors: Masashi Yoshimura; Jin-Joo Matsui; Takehisa Yamamoto; Akira Yamakawa, all of Itami, Japan

[73] Assignee: Sumitomo Electric Industries, Ltd., Japan

[21] Appl. No.: 118,023

[22] Filed: Sep. 8, 1993

[30] Foreign Application Priority Data

Sep. 21, 1992 [JP] Japan ................................. 4-276607

[51] Int. Cl.$^5$ ............................................. C04B 35/58
[52] U.S. Cl. ........................................ 501/97; 501/98; 264/65; 264/66
[58] Field of Search ................ 501/97, 98; 264/65, 264/66

[56] References Cited

U.S. PATENT DOCUMENTS

| | | | |
|---|---|---|---|
| 5,045,513 | 9/1991 | Mizuno et al. | 264/65 |
| 5,173,458 | 12/1992 | Nishioka et al. | 264/65 |
| 5,214,009 | 5/1993 | Komatsu et al. | 501/97 |

Primary Examiner—Mark L. Bell
Assistant Examiner—Deborah Jones
Attorney, Agent, or Firm—Jordan B. Bierman

[57] ABSTRACT

A silicon sintered body comprising a matrix phase consisting of silicon nitride and a grain boundary phase in which the silicon nitride consists of 66 to 99% by volume of $\beta$-$Si_3N_4$ and/or $\beta'$-sialon with the balance being $\alpha$-$Si_3N_4$ and/or $\alpha'$-sialon, the $\beta$-$Si_3N_4$ and/or $\beta'$-sialon consisting of hexagonal rod-like grains having a diameter of 500 nm or less in the minor axis and an aspect ratio 5 to 25, the $\alpha$-$Si_3N_4$ and/or $\alpha'$-sialon consisting of equiaxed grains having an average diameter of 300 nm or less, and titanium compounds are contained within the grains of the matrix phase and in the grain boundary phase. The sintered body is produced by mixing (1) 100 parts by weight of $\alpha$-$Si_3N_4$ powder, (2) 0.1 to 10 parts by weight of titanium oxide having an average particle size of 100 nm or less and (3) 2 to 15 parts by weight, in total, of specified sintering aids; molding the resultant powder mixture into a green compact; subjecting the green compact to primary sintering and secondary sintering under the prescribed conditions.

3 Claims, No Drawings

SILICON NITRIDE SINTERED BODY AND PROCESS FOR PRODUCING THE SAME

BACKGROUND OF THE INVENTION

1. Field of the Invention

The present invention relates to silicon nitride sintered bodies which have superior mechanical properties in a range of low and intermediate temperatures ranging from room temperature to 1100° C. and are useful as structural ceramic materials for automobile parts, wear resistant tools or the like. The present invention also relates to a process for producing such silicon nitride sintered bodies.

2. Description of the Prior Art

Silicon nitride is a material well balanced in strength, fracture toughness, corrosion resistance, wear resistance, thermal shock resistance and oxidation resistance, etc., and has been extensively used in a wide variety of applications, such as cutting tools, engine parts or the like. Especially, in recent years, sintered bodies of silicon nitride have attracted attention as structural materials for automobile engines, gas turbines, etc. However, in order to use the sintered bodies of silicon nitride in fields requiring high reliable materials, for example, in automobile engines, etc., it is indispensable to further improve the fracture toughness of the silicon nitride bodies to overcome the brittleness thereof and, at the same time, improve the strength.

For such requirements, for example, as disclosed in Japanese Patent Application Laid-Open No. 62-265173, there has been proposed a technique for dispersing silicon carbide whiskers in a silicon nitride matrix. It is thought that according to this technique, the fracture toughness is improved by that cracks, which may progress and expand during the fracture, are deflected by the whiskers or extraction or crosslinking of the whiskers takes place. However, since it is substantially difficult to completely remove the agglomerates of the whiskers by a mechanical means and the size thereof is of the order of 1 to 10 μm, such whiskers or agglomerates act as fracture origins of the sintered body, thereby lowering the strength thereof.

Further, for example, as disclosed in Japanese Patent Application Laid-Open No. 63-159256, there has been proposed a silicon nitride-silicon carbide composite sintered body in which silicon carbide having an average particle size of 1 μm or less is evenly dispersed in silicon nitride. However, even with the aforementioned composite sintered body of silicon nitride-silicon carbide composite sintered body, an insufficient proportion of silicon carbide tends to form columnar crystal grains of silicon nitride and causes the abnormal grain growth. Therefore, the defect size is increased and only a very slight improvement is observed in the strength although some improvement is obtained in the fracture toughness. On the other hand, an excessive proportion of silicon carbide suppresses the formation of columnar crystal grains of silicon nitride, thereby lowering the fracture characteristics contrary to an increase in strength.

As set forth above, it has been extremely difficult to simultaneously improve the strength and fracture toughness since, in known attempts as described above to increase the strength or fracture toughness of silicon nitride sintered bodies, an increase in the strength by refinement of the structure lowers the fracture toughness and conversely, an improvement in the fracture toughness by the addition of whiskers or by allowing large columnar crystals to exist by the grain growth of silicon nitride leads to the lowering of the strength.

SUMMARY OF THE INVENTION

In view of the problems encountered in the prior art, an object of the present invention is to provide a silicon nitride sintered body in which the strength and fracture toughness are simultaneously improved by providing a fine grain structure free from coarse grain and incorporating hexagonal rod-like grains of large aspect ratio therein. More specifically, it is an object of the present invention to provide a silicon nitride body including titanium compounds, such as titanium nitride, within grains and grain boundaries, and a process for producing the same.

In order to achieve the above-mentioned objects, in the silicon nitride sintered body of the present invention, silicon nitride constituting a matrix phase consists of 66 to 99% by volume of $\beta$-Si$_3$N$_4$ and/or $\beta'$-sialon with the balance being $\alpha$-Si$_3$N$_4$ and/or $\alpha'$-sialon, wherein the $\beta$-Si$_3$N$_4$ and/or $\beta'$-sialon consists of hexagonal rod-like grains having a diameter of 500 nm or less in the minor axis and an aspect ratio (ratio of the diameter in the major axis to the diameter in the minor axis; the same shall apply hereinafter) of 5 to 25 and the $\alpha$-Si$_3$N$_4$ and/or $\alpha'$-sialon consists of equi-axed grains having an average diameter of 300 nm or less, and titanium compounds are contained within the grains of the matrix phase and in a grain boundary phase.

A process for producing the silicon nitride sintered body of the present invention comprises the steps of:

mixing (1) 100 parts by weight of $\alpha$-Si$_3$N$_4$ powder, (2) 0.1 to 10 parts by weight of titanium oxide having an average particle size of 100 nm or less and (3) 2 to 15 parts by weight, in total, of a sintering aid consisting of at least one of Al oxide and Al nitride, at least one of oxides and nitrides of Mg, Ca and Li, at least one of oxides of rare earth elements;

molding the resultant powder mixture into a green compact;

subjecting the green compact to a primary sintering at a temperature of 1300° to 1600° C. in an inert gas atmosphere; and subjecting the primary sintered body to a secondary sintering at a temperature of 1400° to 1650° C. in an inert gas atmosphere.

DETAILED DESCRIPTION OF THE PREFERRED EMBODIMENTS

In the silicon nitride sintered body of the present invention, silicon nitride constituting the matrix phase consists of 66 to 99% by volume of $\beta$-Si$_3$N$_4$ and/or $\beta'$-sialon and balance $\alpha$-Si$_3$N$_4$ and/or $\alpha'$-sialon. When the volume fraction of the $\beta$-Si$_3$N$_4$ and/or $\beta'$-sialon is less than 66% by volume, the fracture toughness is not improved, whereas a proportion of the $\beta$-Si$_3$N$_4$ and/or $\beta'$-sialon exceeding 99% by volume leads to a considerable strength reduction due to abnormal growth of $\beta$-Si$_3$N$_4$ and/or $\beta'$-sialon grains.

As mentioned above, in the silicon nitride sintered body of the present invention, silicon nitride consists of $\alpha$-Si$_3$N$_4$ and/or $\alpha'$-sialon and $\beta$-Si$_3$N$_4$ and/or $\beta'$-sialon crystal phase, in which $\alpha'$-sialon and $\beta'$-sialon are solid solution crystal phases, respectively, represented by the general formula of M$_x$(Si, Al)$_{12}$(O, N)$_{16}$ (wherein M is at least one member selected from the group consisting of Ti, Li, Mg, Ca and rare earth elements and $0<x\leq 2.0$) and the general formula of $Si_{6-z}Al_zO_zN_{8-z}$ (wherein $0<z\leq 4.2$). Further, the grain boundary phase between the matrix phase is made up of a glass phase or an amorphous phase originating from the sintering aids, etc., and is composed of elements of six groups consisting of (1) Ti, (2) Al, (3) at least one selected from the group consisting of Mg, Ca and Li, (4) at least one selected from the group consisting of rare earth elements, (5) Si and (6) oxygen and nitrogen.

The silicon nitride and/or sialon constituting the matrix phase consists of hexagonal rod-like grains having a minor axis length of 500 nm or less and an aspect ratio of 5 to 25 and equi-axed grains having an average grain size of 300 nm or less. In such a structure, a fine and uniform structure can be achieved with an significantly enhanced strength. In addition, it is believed that propagation of cracks is deflected by the coarse hexagonal rod-like grains having the above-mentioned large aspect ratio or prevented by the extraction effect of crosslinking effect thereof and these effects contribute to an enhancement in the fracture toughness.

Further, titanium compounds consisting mainly of nitride compounds, such as titanium nitride, are contained in the matrix phase and the grain boundary phase of the present invention. Due to the dispersion of the titanium compounds, residual compressive stress is produced by the difference in thermal expansion coefficient between the dispersed titanium compounds and the matrix phase, etc., at the time of cooling from the sintering temperature to room temperature and, thereby, resistance to the occurrence and propagation of cracks is increased. As a result, an improved fracture toughness can be obtained. Since the dispersed titanium compounds are fine particles of the order of nanometer, the dispersion of the such fine particles does not induce the increase of defect size and results in an improvement in the strength.

In the sintered body of the present invention, the proportion of the titanium compounds within the matrix crystal grains is preferably within a range of 0.01 to 5% by volume, more preferably within a range of 0.5 to 2% by volume, based on the total volume of the matrix phase grains incorporating the titanium compounds therein and the amount of the titanium compounds dispersed in the grain boundary phase is preferably within a range of 0.1 to 5% by volume, more preferably within a range of 0.5 to 2.5% by volume, with respect to the total volume of the grain boundary phase including the titanium compounds dispersed therein. The reason for these proportions is as follows. When the volume proportions of the titanium compounds dispersed within the matrix crystal grains and the grain boundary phase are too small, the effect of enhancing the strength and fracture toughness cannot be exhibited, whereas excess volume proportions of the dispersed titanium compounds cause the occurrence of agglomeration of the titanium compounds or the formation of silicon oxynitride ($Si_2N_2O$).

Further, when the average particle size of the titanium compounds to be dispersed in the matrix crystal grains is too small, the titanium compounds are allowed to dissolve between interstices of the crystal lattices to form an interstitial solid solution. When the dispersed titanium compound particles are excessively large, they cannot act as nuclei for crystal growth and they are present in the grain boundary. Therefore, the average particle size of the titanium compounds is preferably from 1 to 100 nm. On the other hand, the average particle size of the titanium compound particles to be dispersed in the grain boundary phase is preferably in the range of 300 nm or less.

In the production of the silicon nitride sintered body according to the present invention, as source material powders, $\alpha$-$Si_3N_4$ powder is used together with titanium oxide powder, for example $TiO_2$ powder, having an average particle size of 100 nm or less. The titanium oxide added is converted as titanium nitride or other nitride compounds in the resulting sintered body. When the average particle size of the used titanium oxide powder exceeds 100 nm, it yields only an extremely limited amount of titanium compounds in the matrix crystal grains and results in the formation of coarse titanium compound particles, thereby considerably lowering the mechanical properties of the resultant sintered body.

The amount of the titanium oxide powder is 0.1 to 10 parts by weight relative to 100 parts by weight of $\beta$-$Si_3N_4$ powder. When the amount is less than 0.1 part by weight, the amount of the titanium compounds resulting therefrom is too small to contribute to improvement in the mechanical properties. On the other hand, when the addition of titanium oxide exceeds 10 parts by weight, agglomeration or coagulation of the titanium compounds takes place to form coarse particles, thereby causing a considerable deterioration of the mechanical properties.

The sintering aids used consists of a combination of at least one of aluminum oxide and Al nitride; at least one selected from among oxides and nitrides of Mg, Ca and Li, and at least one selected from among oxides of rare earth elements, such as Y, Yb, etc. Such a combination of sintering aids improves the sinterability by forming a liquid phase through the reaction between the sintering aid and $SiO_2$ present on the surface of silicon nitride and lowers the sintering temperature, resulting in a fine and dense sintered body. The total of the above three kinds of sintering aids is 2 to 15 parts by weight relative to 100 parts by weight of $\alpha$-$Si_3N_4$ powder. The reason for this is that when the amount of the sintering aids is less than 2 parts by weight, silicon nitride will not be sintered because of its covalent bonding property, whereas an amount exceeding 15 parts by weight results in an acceptably large quantity of grain boundary phase, resulting in a considerable deterioration of the mechanical properties of the sintered body.

The above-mentioned $\alpha$-$Si_3N_4$ powder, titanium oxide powder and sintering aid powders are mixed and molded into a green compact. The resultant green compact is subjected to a primary sintering at 1300° to 1600° C. in an inert gas atmosphere such as nitrogen until a relative density of 95% to 98.5% is achieved. During the primary sintering at 1300° to 1600° C., fine titanium compounds which are considered to act as nuclei for the precipitation of crystal grains of $\beta$-$Si_3N_4$, are precipitated and a sintered body comprising fine crystal grains of $\alpha$-$Si_3N_4$ and/or $\alpha'$-sialon and $\beta$-$Si_3N_4$ and/or $\beta'$-sialon in a mixed state is obtained. However, when the primary sintering temperature is less than 1300° C., a relative density of at least 95% required for the successive secondary sintering will not be obtained. On the other hand, although a temperature exceeding 1600° C. provides a primary sintered body having a relative density exceeding 98.5%, such a high primary sintering temperature may bring about an abnormal grain growth of $\beta$-$Si_3N_4$ and/or $\beta'$-sialon, thus causing a considerable lowering in the mechanical properties of the finally obtained sintered body product.

The primary sintered body thus obtained is then subjected to secondary sintering at a temperature of 1400° to 1650° C. in an inert gas atmosphere to obtain a highly densified sintered body having a relative density of 99% or more. The inert atmosphere is preferably nitrogen. In order to achieve the densification of 99% or more in relative density, a pressure of at least 10 atm is required as the atmospheric pressure. When the secondary sintering temperature is less than 1400° C., no sintered body having a relative density of 99% or more can be obtained, whereas a secondary sintering temperature exceeding 1650° C. may bring about an abnormal grain growth of $\beta$-Si$_3$N$_4$ and/or $\beta'$-sialon, thus resulting in a considerable deterioration in the mechanical properties of the resultant sintered body. The above-mentioned primary sintering may be preferably performed either by hot pressing (HP) or by normal-pressure sintering and the secondary sintering may be preferably by hot isostatic pressing (HIP).

During this secondary sintering, although $\beta$-Si$_3$N$_4$ and/or $\beta'$-sialon precipitates and grows, this grain growth is suppressed by the titanium compounds present in the grain boundary and uniformly fine grains are formed. Further, the secondary step precipitates fine hexagonal rod-like grains with a large aspect ratio. The reason for these effects has not yet elucidated, but it is believed that silicon nitride crystals easily grow in a certain direction due to the change in the properties of the liquid phase by the addition of the titanium oxide, good matching between the silicon nitride crystal grains and titanium compounds present in the crystal grains, dissolution of the titanium within the silicon nitride crystal grains in the state of solid solution, etc.

EXAMPLE 1

TiO$_2$ powder and sintering aids were added to Si$_3$N$_4$ powder having an average grain size of 0.7 μm and a percentage α crystallization of 93% and wet-mixed in ethanol for 100 hours, using a nylon ball mill. The average particle size of the TiO$_2$ powder and the mixing proportions (wt. % based on the weight of α-Si$_3$O$_4$ powder) in each sample are shown in Table 1. In the samples excepting Sample No. 20, the sintering aids consisted of 2% Al$_2$O$_3$, 1% MgO, 1% AlN and 5% Y$_2$O$_3$ in weight percentages based on the weight of the α-Si$_3$O$_4$ powder. In Sample No. 20, Yb$_2$O$_3$ was used in a amount of 5% in place of Y$_2$O$_3$.

The thus obtained mixed powders were filled into a mold and subjected to molding under pressure to provide green compacts. Each green compact thus molded was subjected to primary sintering in a nitrogen gas atmosphere by a hot pressing (HP) process or a normal-pressure sintering (NS) process and, then, subjected to secondary sintering in a nitrogen gas atmosphere under a pressure of 1000 atm by HIP (hot isostatic press). The sintering temperature and sintering method of the primary sintering and secondary sintering are shown in Table 1.

TABLE 1

| Sample No. | Amount of TiO$_2$ (wt %) | Average particle size of TiO$_2$ (nm) | Primary sintering temp. (°C.) | Secondary sintering temp. (°C.) | Sintering method |
| --- | --- | --- | --- | --- | --- |
| 1* | 0 | — | 1490 | 1625 | HP + HIP |
| 2 | 0.1 | 30 | 1490 | 1625 | HP + HIP |
| 3 | 1.0 | 30 | 1490 | 1625 | HP + HIP |
| 4 | 2.0 | 30 | 1490 | 1625 | HP + HIP |
| 5 | 5.0 | 30 | 1490 | 1625 | HP + HIP |
| 6 | 10.0 | 30 | 1490 | 1625 | HP + HIP |
| 7* | 20.0 | 30 | 1490 | 1625 | HP + HIP |
| 8* | 0 | — | 1525 | 1625 | NS + HIP |
| 9 | 0.1 | 30 | 1525 | 1625 | NS + HIP |
| 10 | 1.0 | 30 | 1525 | 1625 | NS + HIP |
| 11 | 2.0 | 30 | 1525 | 1625 | NS + HIP |
| 12 | 5.0 | 30 | 1525 | 1625 | NS + HIP |
| 13 | 10.0 | 30 | 1525 | 1625 | NS + HIP |
| 14* | 2.0 | 30 | 1525 | 1300 | NS + HIP |
| 15* | 2.0 | 30 | 1525 | 1350 | NS + HIP |
| 16* | 2.0 | 30 | 1525 | 1700 | HP + HIP |
| 17* | 2.0 | 30 | 1250 | 1625 | HP + HIP |
| 18* | 2.0 | 500 | 1490 | 1625 | NS + HIP |
| 19* | 2.0 | 500 | 1525 | 1625 | HP + HIP |
| 20 | 2.0 | 30 | 1525 | 1625 | HP + HIP (Yb$_2$O$_3$) |

Note:
*Comparative Samples 15 bending test pieces each having a size of 3 mm×4 mm×40 mm conforming to JIS R 1601 were cut out of each of the sintered bodies obtained above and finished through machining. The three-point bending strength test was conducted on the 15 finished test pieces for each sintered body at room temperature to obtain their average bending strengths. The relative density of each sintered body was determined by the Archimedes' method and the crystal phase ratio of each sintered body was calculated from the peak height ratio of individual crystal phases by X-ray diffraction. Fracture toughness measurements were conducted by the IF (indentation fracture) method.

In order to measure the average diameters of equi-axed grains of α-Si$_3$N$_4$ and/or α'-sialon and hexagonal rod-like grains of $\beta$-Si$_3$N$_4$ and/or $\beta'$-sialon and the aspect ratio of the hexagonal rod-like grains, each sintered body was subjected to lapping and etching treatments at its arbitrary surface and the thus treated surface was observed at 50 fields thereof under a scanning electron microscope (magnification: x 5,000). The average diameters of the equi-axed grains of α-Si$_3$N$_4$ and/or α'-sialon were determined by measuring the average diameters of circular grains. The average diameter of the hexagonal rod-like grains of $\beta$-Si$_3$N$_4$ and/or $\beta'$-sialon were determined by measuring the average diameters in the respective directions of the minor axis and major axis of square-shaped or rectangular grains. Further, the average particle sizes and volume proportions (vol. %) of Ti compounds present within each of the matrix phase grains and grain boundary phase were measured on 20 fields of each phase with a transmission electron microscopy (magnification: x 20,000). The volume proportion of the Ti compounds present in each of matrix phase grains and grain boundary phase was calculated by raising the area proportion of the Ti compounds in each phase to the 3/2 power, i.e., $$(\sqrt{\text{area proportion of Ti compounds in matrix phase grains}})^3$$

or $$(\sqrt{\text{area proportion of Ti compounds in grain boundary phase}})^3.$$

The test results are shown in Table 2 in which α percentage of $Si_3N_4$ and/or sialon is the proportion of the $\alpha$-$Si_3N_4$ and/or $\alpha'$-sialon in the silicon nitride and/or sialon constituting the matrix phase, namely, $$\frac{\alpha\text{-}Si_3N_4 \text{ and/or } \alpha'\text{-sialon}}{(\alpha\text{-}Si_3N_4 \text{ and/or } \alpha'\text{-sialon}) + (\beta\text{-}Si_3N_4 \text{ and/or } \beta'\text{-sialon})}.$$

considerably deteriorated because of unacceptable primary or secondary sintering temperature. The samples of the present invention all showed no lowering in their strength up to 1100° C.

EXAMPLE 2

Further sintered bodies were prepared under the conditions shown in Table 3 in a similar way as described in Example 1 except that sintering aids consisting of 0.5% $Al_2O_3$, 13.5% $MgAl_2O_4$, and 5% $Y_2O_3$ or $Yb_2O_3$ in weight percentages based on the weight of the $\alpha$-$Si_3N_4$ powder and the mixed powders were wet-mixed in water having a pH of 9. The thus obtained sintered bodies were tested for their properties as set forth in Example 1. The results are summarized in Table 4.

TABLE 2

| | α Percentage of $Si_3N_4$ and/or sialon (vol. %) | Hexagonal rod-like grain | | Equi-axed grain | Ti compound | | | |
|---|---|---|---|---|---|---|---|---|
| | | | | | Grain boundary | | Matrix grain | |
| Sample No. | | Average aspect ratio | Average diameter (nm)** | Average diameter (nm) | vol. % | Average particle size (nm) | vol % | Average particle size (nm) |
| 1* | 18.6 | 10 | 300 | 200 | — | — | — | — |
| 2 | 17.5 | 15 | 200 | 200 | 10.1 | 100 | 0.08 | 40 |
| 3 | 17.3 | 22 | 180 | 200 | 0.5 | 150 | 0.9 | 50 |
| 4 | 17.2 | 25 | 200 | 200 | 1 | 200 | 1.7 | 50 |
| 5 | 16.5 | 20 | 200 | 200 | 2 | 200 | 4.5 | 50 |
| 6 | 15.2 | 15 | 200 | 200 | 5 | 250 | 3.7 | 70 |
| 7* | 11.0 | 7 | 300 | 200 | 25 | 600 | 5.0 | 70 |
| 8* | 18.9 | 10 | 250 | 200 | — | — | — | — |
| 9 | 18.5 | 15 | 300 | 200 | 0.1 | 100 | 0.07 | 40 |
| 10 | 18.0 | 20 | 200 | 200 | 0.5 | 150 | 0.8 | 50 |
| 11 | 17.9 | 21 | 200 | 200 | 1 | 200 | 1.6 | 50 |
| 12 | 14.0 | 18 | 200 | 200 | 2 | 200 | 3.5 | 50 |
| 13 | 10.2 | 6 | 250 | 200 | 5 | 250 | 5.0 | 70 |
| 14* | 65.2 | 3 | 500 | 400 | 2 | 200 | 0.5 | 50 |
| 15* | 63.2 | 4 | 500 | 400 | 2 | 200 | 0.5 | 50 |
| 16* | 1.5 | 19 | 500 | 200 | 0.5 | 200 | 1.8 | 50 |
| 17* | 75.0 | — | — | — | — | — | — | — |
| 18* | 10.2 | 7 | 300 | 200 | 5 | 1000 | 0.02 | 200 |
| 19* | 9.9 | 7 | 300 | 200 | 5 | 1000 | 0.01 | 200 |
| 20 | 19.9 | 22 | 200 | 200 | 0.5 | 200 | 1.7 | 50 |

Notes:
*Comparative Samples
Comparative Samples No. 17 was not sintered by primary sintering because of too low primary sintering temperature.
**Average diameter in minor axis

| Sample No. | Relative density (%) | Bending strength (kg/mm²) | Fracture toughness (MPam$^{\frac{1}{2}}$) |
|---|---|---|---|
| 1* | 100 | 150 | 6.5 |
| 2 | 99.9 | 160 | 6.8 |
| 3 | 99.9 | 220 | 8.0 |
| 4 | 99.9 | 230 | 9.1 |
| 5 | 99.9 | 200 | 9.0 |
| 6 | 99.4 | 160 | 6.5 |
| 7* | 95.0 | 100 | 6.0 |
| 8* | 100 | 145 | 6.0 |
| 9 | 99.9 | 150 | 6.5 |
| 10 | 99.9 | 190 | 7.7 |
| 11 | 99.9 | 195 | 8.6 |
| 12 | 99.2 | 165 | 8.0 |
| 13 | 99.5 | 155 | 6.0 |
| 14* | 94.0 | 70 | 4.0 |
| 15* | 94.5 | 72 | 4.1 |
| 16* | 100 | 93 | 7.9 |
| 17* | 60.0 | — | — |
| 18* | 99.7 | 91 | 6.8 |
| 19* | 99.0 | 75 | 9.0 |
| 20 | 99.9 | 235 | 9.0 |

Notes:
*Comparative Samples

It is clear from the above results shown in Table 2 that the samples of the present invention all have high levels of strength and fracture toughness well comparable to or superior to comparative samples (Sample Nos. 1 and 8) without addition of titanium oxide, a comparative sample (Sample No. 7) including an excessive addition of titanium oxide and comparative samples (Sample Nos. 18 and 19) including titanium oxide having an unacceptably large particle size. In remaining comparative samples, their strength or fracture toughness is

TABLE 3

| Sample No. | Amount of TiO$_2$ (wt %) | Average particle size of TiO$_2$ (nm) | Primary sintering temp. (°C.) | Secondary sintering temp. (°C.) | Sintering method |
|---|---|---|---|---|---|
| 21 | 2.0 | 30 | 1500 | 1625 | NS + HIP (Y$_2$O$_3$) |
| 22 | 2.0 | 30 | 1500 | 1625 | NS + HIP (Y$_2$O$_3$) |

TABLE 4

| Sample No. | α Percentage of Si$_3$N$_4$ and/or sialon (%) | Hexagonal rod-like grain | | Equi-axed grain | Ti compound | | | |
| | | | | | Grain boundary | | Matrix grain | |
| | | Average aspect ratio | Average diameter (nm)* | Average diameter (nm) | vol. % | Average particle size (nm) | vol % | Average particle size (nm) |
|---|---|---|---|---|---|---|---|---|
| 21 | 18.6 | 21 | 200 | 200 | 0.5 | 150 | 1.7 | 50 |
| 22 | 18.3 | 23 | 200 | 200 | 0.5 | 150 | 1.6 | 50 |

*Average diameter in minor axis

| Sample No. | Relative density (%) | Bending strength (kg/mm$^2$) | Fracture toughness (MPam$^{\frac{1}{2}}$) |
|---|---|---|---|
| 21 | 99.9 | 202 | 9.1 |
| 22 | 99.9 | 198 | 8.8 |

As will be apparent from the above results, the present invention provides silicon nitride sintered bodies superior in both strength and fracture toughness also when the source material powders are wet-mixed in an aqueous solvent.

According to the present invention, silicon nitride ceramics superior in both strength and fracture toughness can be obtained and the ceramics are very useful as structural ceramic materials for automobile parts, which requires a high reliability, wear-resistant tools or the like.

What is claimed is:

1. A silicon nitride sintered body comprising a matrix phase consisting of silicon nitride, and a grain boundary phase in which the silicon nitride consists of 66% to 99% by volume of β-Si$_3$N$_4$, β'-sialon, or a combination thereof, with the balance comprising α-Si$_3$N$_4$, α'-sialon, or a combination thereof, said β-Si$_3$N$_4$ and β'-sialon consisting of hexagonal rod-shaped grains having a maximum minor axis diameter of 500 nm and an aspect ratio of 5 to 25, said α-Si$_3$N$_4$ and α'-sialon consisting of equi-axised grains having a maximum average diameter of 300 nm, titanium compounds being contained within grains of said matrix phase and in said grain boundary phase, said titanium compound contained within said grains of said matrix phase having an average particle size of 1 to 100 nm and being present in an amount of 0.01% to 5% by volume, based on the total volume of the matrix phase, including said titanium compounds dispersed therein, said titanium compounds contained in said grain boundary phase having a maximum average particle size of 300 nm, and being present in an amount of 0.1% to 5% by volume, based on the total volume of said grain boundary phase, including the titanium compounds dispersed therein.

2. The silicon nitride sintered body of claim 1, wherein the grain boundary phase of the matrix phase is composed of elements of six groups consisting of (1) Ti, (2) Al, (3) at least one selected from the group consisting of Mg, Ca and Li, (4) at least one selected from the group consisting of rare earth elements, (5) Si and (6) oxygen and nitrogen.

3. A process for producing a silicon nitride sintered body, comprising:

mixing (1) 100 parts by weight α-Si$_3$N$_4$ powder, (2) 0.1 to 10 parts by weight titanium oxide having a maximum average particle size of 100 nm and (3) 2 to 15 parts by weight, in total, of a sintering aid consisting of (a) at least one of Al oxide and Al nitride, (b) at least one of an oxide or nitride of Mg, Ca, and Li, and (c) at least one oxide of a rare earth element to form a resultant powder;

molding the resultant powder mixture into a green compact;

subjecting said green compact to a primary sintering at a temperature of 1300° C. to 1600° C. in an inert gas atmosphere until a relative density of 95% to 98.5% is achieved, therefore forming a sintered body; and subjecting the sintered body formed by said primary sintering to a secondary sintering at a temperature of 1400° C. to 1650° C. in an inert gas atmosphere to achieve a relative density of at least 99%.

* * * * *